United States Patent [19]

Clancy

[11] Patent Number: 4,718,821
[45] Date of Patent: Jan. 12, 1988

[54] WINDMILL BLADE

[76] Inventor: Brian D. Clancy, 2409 4th Ave. North, St. Petersburg, Fla. 33713

[21] Appl. No.: 870,738

[22] Filed: Jun. 4, 1986

[51] Int. Cl.$^4$ .............................................. F03D 7/06
[52] U.S. Cl. .................................... 416/44; 416/119; 416/139; 416/176
[58] Field of Search .............. 416/119, 176 A, 169 B, 416/139 A, 44 A, 32, DIG. 8, 175 A

[56] References Cited

U.S. PATENT DOCUMENTS

| | | | |
|---|---|---|---|
| 1,766,765 | 6/1930 | Savonius | 416/132 B |
| 2,067,542 | 1/1937 | Penton | 416/51 A |
| 2,480,687 | 8/1949 | Albers et al. | 416/132 B |
| 3,918,839 | 11/1975 | Blackwell et al. | 416/175 A |
| 4,048,947 | 9/1977 | Sicard | 416/139 A X |
| 4,082,479 | 4/1978 | Rangi et al. | 416/169 B X |
| 4,247,252 | 1/1981 | Seki et al. | 416/175 A X |
| 4,247,253 | 1/1981 | Seki et al. | 416/119 X |
| 4,293,274 | 10/1981 | Gilman | 416/176 A X |
| 4,334,823 | 6/1982 | Sharp | 416/139 A X |
| 4,415,312 | 11/1983 | Brenneman | 416/139 A X |
| 4,452,568 | 6/1984 | Andersson | 416/139 A X |
| 4,500,257 | 2/1985 | Sullivan | 416/32 |

FOREIGN PATENT DOCUMENTS

| | | | |
|---|---|---|---|
| 1045038 | 12/1978 | Canada | 416/119 |
| 2948060 | 6/1981 | Fed. Rep. of Germany | 416/227 A |
| 530231 | 12/1921 | France | 416/119 |
| 771804 | 10/1934 | France | 416/119 |
| 1341652 | 9/1963 | France | 416/DIG. 8 |
| 2392249 | 1/1979 | France | 416/DIG. 8 |
| 2,481,756 | 11/1981 | France | 416/139 A |
| 84871 | 6/1980 | Japan | 416/197 A |
| 161979 | 12/1980 | Japan | 416/119 |
| 90992 | 5/1985 | Japan | 416/DIG. 8 |
| 1518151 | 7/1978 | United Kingdom | 416/176 A |
| 2165008 | 4/1986 | United Kingdom | 416/176 A |

*Primary Examiner*—Everette A. Powell, Jr.
*Attorney, Agent, or Firm*—Ronald E. Smith; Miguel A. Valdes

[57] ABSTRACT

A self-starting windmill of the vertical axis type. Upstanding helical in configuration, pivotally mounted outer blade members surround a central, rotatably mounted shaft are connected to the shaft by radially disposed strut members. Arcuate in planform, pivotally mounted inner blade members are mounted radially inwardly of the outer blade members in a collective triangular configuration and have their respective convex surfaces facing toward the shaft. A weight member and a spring member bias a preselected edge of each outer blade member against wind force.

1 Claim, 4 Drawing Figures

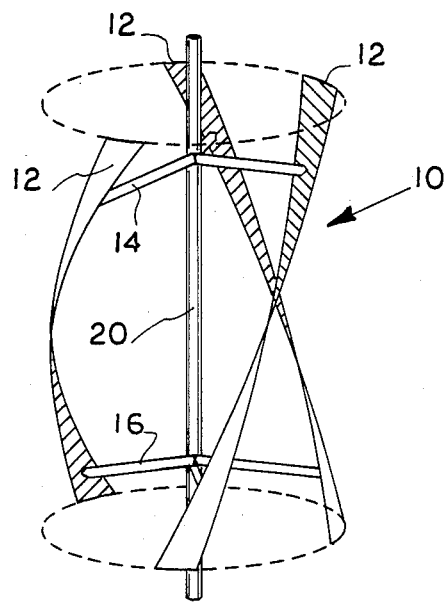
FIG_1
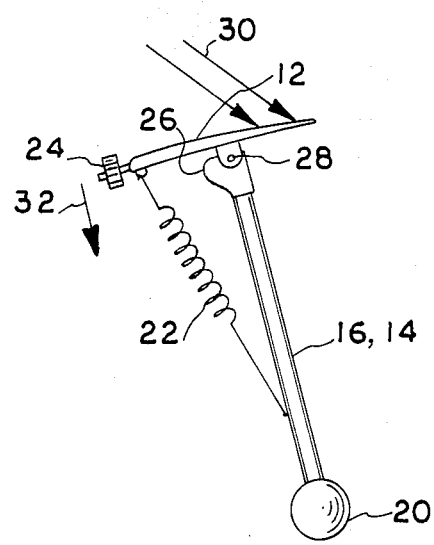
FIG_2

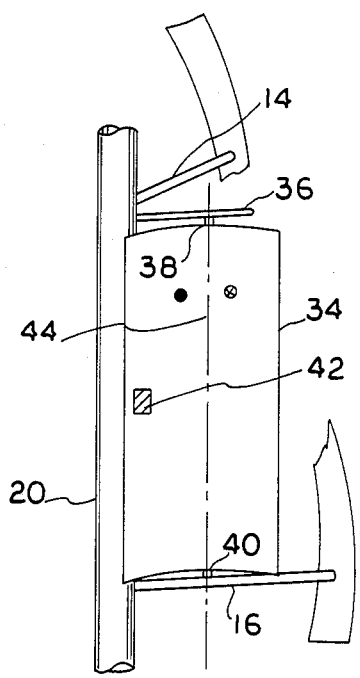
FIG_3
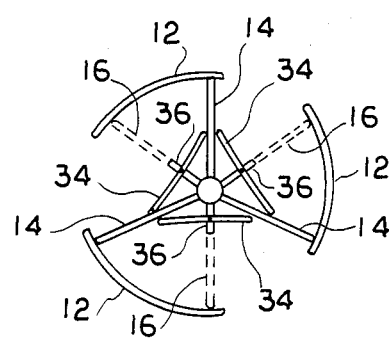
FIG_4

WINDMILL BLADE

BACKGROUND OF THE INVENTION

1. Field of the Invention

This invention relates to windmills, generally, and more particularly relates to a windmill construction of the vertical axis type having an upstanding set of rotatably mounted outer blades and an upstanding set of conjointly rotatable inner blades positioned radially inwardly of the outer blades.

2. Description of the Prior Art

Vertical axis windmills in general are well known, of course, and have been described in numerous U.S. and foreign patents.

For example, U.S. Pat. No. 2,515,713, awarded in 1950 to Johnson and other, discloses a mixer device having helical blades of the type that could be adapted for a windmill construction.

U.S. Pat. No. 4,115,032, issued in 1978 to Lange, shows a windmill having blades that rotate about a vertical axis. The Lange device converts the energy of wind into mechanical rotation of an upstanding output shaft for driving an electric generator, a pump, or the like.

A U.S. patent awarded in 1981 to Dereng, U.S. Pat. No. 4,264,279, discloses a self starting wind turbine having a single blade rotatable about a vertical axis.

Another U.S. patent to Lange, U.S. Pat. No. 4,543,042 (1985), discloses a windmill rotor of the vertical axis type having at least three main blades mounted symmertrically around a shaft which blades are bowed to define a generally spherical configuration.

U.S. Pat. No. 4,281,965, awarded in 1981 to Stjernhom, discloses a cantilever mounted wind turbine having an interior stationary support column and a concentrically mounted rotatable rotor.

None of the earlier patents known to the present inventor teaches a windmill having blades constructed out of a metal drum, nor do the patents of the prior art of which the present inventor is aware include mechanisms for maintaining a constant rotational velocity of the type disclosed hereinafter.

It is an important object of this invention is to provide a mechanism that allows rotational movement of windmill blades at a constant, nonsurging speed, which speed is maintained independent of wind speed.

Another object of this invention is to provide a simple method of constructing windmill blades from readily available materials.

SUMMARY OF THE INVENTION

The invention accomplishes these and other objects that will become apparent as this disclosure proceeds by providing a windmill that includes helical blades positioned around a rotatably mounted vertical shaft to which the blades are attached for conjoint rotation by radially disposed struts.

A governor means includes a plurality of inner blade members having an arcuate plan form.

The novel device provides various features and advantages. The windmill is self-starting since there is no need for the application of an external force other than wind force to set it in motion.

Moreover, the blades of the windmill can be formed from a metallic drum, and any number of blades may be emplyed, including only one blade.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of the outer blade members of the novel device;

FIG. 2 is a plan view of a first embodiment of a governor mechanism according to the invention;

FIG. 3 is a perspective view of a second embodiment of a governor mechanism according to the invention; and FIG. 4 is a plan view showing the governor mechanism of FIG. 3.

Similar reference numerals refer to similar parts throughout the several views of the drawings.

DETAILED DESCRIPTION OF THE PREFERRED EMBODIMENT

FIG. 1 shows three blade members, collectively designated 12, of the novel windmill 10 arranged in a helical configuration with respect to shaft 20.

The phantom lines appearing in FIG. 1 suggest the presence of a drum such as a fifty five gallon drum, it being understood that blade members 12 could be cut from such a drum.

Each blade 12 is fixedly secured for conjoint rotation to rotatably mounted shaft 20 by a plurality of radially disposed upper strut members 14 and lower strut members 16.

Referring now to FIG. 2, a first embodiment of the governor mechanism for windmill 10 is shown.

Each blade 12, only one of which is shown in FIG. 2 to simplify the drawing, is pivotally mounted as at 28 to its associated lower radial strut 16 and its associated upper radial strut 14. This pivotal mount enables each blade member 12 to pivot about pivot point 28, in response to wind forces indicated by directional arrows 30, while simultaneously rotating about shaft 20.

Travel stop 26 limits the pivotal movement of each blade 12, and a pair of horizontally disposed, vertically spaced spring members 22, only one of which is shown in FIG. 2, extend from vertically spaced points on the trailing edge of each blade 12 to associated upper or lower strut members 14 and 16.

A lead weight 24 is fixedly secured to the trailing edge of each blade 12 adjacent each upper and lower spring 22 as depicted. When wind exerts pressure against the blade members 12, such pressure is counteracted by the tension of spring 22, the gravitational force of lead weight 24 and the centrifugal force generated by the rotation of the outer blade members 12. Thus, the assembly represents a servomechanism since increased wind pressure will meet with increased resistance so that s substantially constant rotational velocity is achieved. The position of weight member 24 can be adjusted by suitable means to vary the counteracting force. The adjustability of weight member 24 represents a fine tuning means for the governor mechanism.

A second embodiment of the governor mechanism is shown in FIGS. 3 and 4.

This mechanism includes governor blade members 34 disposed in a triangular configuration as shown in FIG. 4. Each blade member 34 has an arcuate planform and the respective convex surfaces of said blade members face shaft 20 as shown. In the position shown in FIG. 4, the wind is not blowing or is blowing lightly because the blade members 34 are in their respective equilibrium, or unpivoted positions in said FIG.

The upper end of each blade member 34 is mounted to its associated radially disposed governor bar member 36 (which governor bar members extend radially from shaft 20 adjacent the upper strut members 14) as at 38: the lower end of each inner blade member 34 is pivotally secured to its associated lower strut member 16 as at 40.

This mounting enables blade members 34 to pivot in response to wind pressure. Such pivotal movement of blades 34 alters their "at rest" triangular configuration. When blades 34 are in their unpivoted position, as depicted in FIG. 4 as a foresaid, their individual and collective resistance to wind pressure is low. When blade members 34 pivot in response to wind pressure, their individual and collective resistance increases. Such increased resistance enables a substantially constant speed rotation of windmill blades 12 because the resistance to the wind offered by each inner blade member 34 is proportional to the wind speed.

Each inner blade member 34 has a center of gravity C.G. and a center of effort C.E.; these centers flank the pivotal axis 44 of each blade 34 as shown in FIG. 3 and serve to balance the blade members 34.

The assembly thus has two governor mechanisms, i.e., the biased pivotal mounting of the outer blades 12 and the uniquely shaped inner blade members 34. Both governing features could be provided in a single windmill, or either mechanism could be provided to the exclusion of the other.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A windmill rotor of the vertical axis type, comprising:

a rotatably mounted, upstanding shaft member;

a plurality of elongate upstanding blade members of airfoil design arranged in a helical configuration in surrounding relation to said shaft member;

said plurality of blade members being three in number and being spaced one hundred twenty degrees from one another and each blade member extending about twenty degrees of arc about an imaginary circle that is swept when said blade members rotate about said shaft member;

a plurality of horizontally disposed, radially extending upper strut members, each upper strut member connecting its associated blade member to said shaft member near the upper end of said shaft member, there being as many upper strut members as there are blade members;

a plurality of horizontally disposed, radially extending lower strut members, each lower strut member connecting its associated blade member to said shaft member near the lower end of said shaft member, there being as many lower strut members as there are blade members:

constant speed means for maintaining constant speed rotation of said blade members during conjoint rotation of said blade members, their associated strut members, and said shaft member;

said constant speed means including a blade member pivotal mounting means for pivotally mounting each of said blade members with respect to their respective vertical axes;

said constant speed means further including biasing means for counteracting the effects of wind impinging upon said blade members;

said biasing means including a weight member fixedly secured to a leading edge of each of said blade members;

said biasing means further including a spring member that interconnects each of said blade members to its associated strut member;

and said pivotal mounting means including a pivotal connection between each of said blade members and their associated strut members at a point that is midwidth of said blade members.

* * * * *